(12) United States Patent
Dorrell (10) Patent No.: US 12,528,552 B2
(45) Date of Patent: Jan. 20, 2026

(54) RAMP GATE TRAILER BED EXTENSION DEVICE AND METHOD OF USE

(71) Applicant: Jay Dorrell, Lumberton, TX (US)

(72) Inventor: Jay Dorrell, Lumberton, TX (US)

(*) Notice: Subject to any disclaimer, the term of this patent is extended or adjusted under 35 U.S.C. 154(b) by 669 days.

(21) Appl. No.: 18/146,648

(22) Filed: Dec. 27, 2022

(65) Prior Publication Data

US 2023/0264767 A1    Aug. 24, 2023

Related U.S. Application Data

(60) Provisional application No. 63/313,458, filed on Feb. 24, 2022.

(51) Int. Cl.
*B62D 63/06* (2006.01)
*B62D 63/08* (2006.01)

(52) U.S. Cl.
CPC .......... *B62D 63/061* (2013.01); *B62D 63/08* (2013.01)

(58) Field of Classification Search
CPC ............................... B62D 63/061; B62D 63/08
See application file for complete search history.

(56) References Cited

U.S. PATENT DOCUMENTS

| | | | | |
|---|---|---|---|---|
| 3,901,398 A * | 8/1975 | Bunch | ........... | B62D 53/062 280/789 |
| 4,023,850 A * | 5/1977 | Tillery | ........... | B62D 33/0273 224/403 |
| 6,126,223 A * | 10/2000 | Rayburn | ........... | B60P 1/438 296/61 |
| 6,183,031 B1 * | 2/2001 | Ballard | ........... | B60P 1/438 296/57.1 |
| 6,485,004 B1 * | 11/2002 | Licata | ........... | F16F 1/128 267/74 |
| 7,000,908 B2 * | 2/2006 | Costello | ........... | E05F 1/1083 267/74 |
| 7,036,863 B2 * | 5/2006 | Hunter | ........... | B60P 1/435 296/61 |
| 7,566,085 B2 * | 7/2009 | Jaskolski | ........... | B62D 33/0273 296/57.1 |
| 10,889,227 B1 * | 1/2021 | Norfleet | ........... | E05F 1/14 |
| 12,447,887 B2 * | 10/2025 | Kaindl | ........... | B62D 33/0273 |

(Continued)

FOREIGN PATENT DOCUMENTS

DE    102013101966 A1 *  9/2014   ............. B60P 1/438
DE    102013101966 B4 * 10/2022   ............. B60P 1/438

*Primary Examiner* — Jacob B Meyer
(74) *Attorney, Agent, or Firm* — Brennan, Manna & Diamond, LLC (57) ABSTRACT

The present invention relates to a ramp gate trailer bed extension device capable of expanding the overall length of a trailer bed for transporting larger cargo. The device is designed as a mechanical device and includes two independent flat iron or telescoping rods, each rod is attached to the trailer and the ramp for enabling up and down movement of the gate. In one embodiment, the ramp becomes substantially horizontal and selectively coplanar with trailer bed to expand the overall trailer length to increase cargo carrying capacity to carry longer items. In other embodiments, the ramp is positioned at a 45-degree angle relative to the trailer bed for offering enhanced aerodynamics for reducing drag on the trailer and increasing fuel economy. Each rod has a clip for secured attachment and offers complete utilization of the ramp for carrying long cargo items.

20 Claims, 6 Drawing Sheets

(56) References Cited

U.S. PATENT DOCUMENTS

2023/0264767 A1\* 8/2023 Dorrell ................ B62D 63/061
                                                       280/656
2024/0149774 A1\* 5/2024 Kaindl .................... B60P 1/435

\* cited by examiner

RAMP GATE TRAILER BED EXTENSION DEVICE AND METHOD OF USE

CROSS-REFERENCE TO RELATED APPLICATION

The present application claims priority to, and the benefit of, U.S. Provisional Application No. 63/313,458, which was filed on Feb. 24, 2022, and is incorporated herein by reference in its entirety.

FIELD OF THE INVENTION

The present invention relates generally to the field of trailers. More specifically, the present invention relates to novel mechanical device used for expanding the overall length of a trailer bed for securely transporting larger cargo. The device comprised of two identical generally four-foot flat iron or telescoping rods that are attached to the ramp or drop gate of a trailer to provide an extended load bed. The opposite ends of the bars are attached to the ramp such that the bars pivot as the ramp moves up and down. The ramp in a horizontal position is used for extended cargo carrying capacity. Accordingly, the present disclosure makes specific reference thereto. Nonetheless, it is to be appreciated that aspects of the present invention are also equally applicable to other like applications, devices, and methods of manufacture.

BACKGROUND

By way of background, a trailer is an unpowered vehicle towed by a powered vehicle such as an SUV, ATV, and other vehicle, and functions as a long rear section of the powered vehicle. The trailer is commonly used for the transport of goods, materials, and cargo. Cargo items having size in accordance with the trailer size are easily and securely stored in the trailer, but some cargo items may be large and bulky and extend over sides of the trailer. Many cargo items are long and may have a length longer than the trailer. This results in the cargo items extending from the trailer which can lead to serious accidents. Especially, at night, such extended items are not visible to fellow drivers that can cause accidents.

Due to large sized cargo items, drivers and operators may not carry them on trailers. As a result, additional vehicles are required to carry such cargo items, which is not only time consuming, but expensive as well. In scenarios, where large sized cargo items are positioned on the trailer, manual devices are required to keep the items safe and further, there are chances of the damage to the portion of the items extending beyond the end of the trailer. Conventionally, only ropes and other fastening mechanisms are used, but they are ineffective to secure storage and balance of the trailer. Lack of adaptability of travel trailers to store and carry large items is a big problem for individuals, and individuals desire a means for securely transporting items having size larger than the size of the trailer. Trailers built expressly for towing loads, especially in the form of wheeled vehicles, have mechanism for tilting for onboarding and offloading cargo items, but do not have means for extending length of the trailer to support items having length greater than length of the trailer.

Aerodynamic drag is a main cause for fuel consumption for vehicles having trailers at the back. Further, when cargo items are stored, the drag increases causing increased fuel consumption. Individuals desire a method and a device that not only expands the length of the trailer bed, but also decreases aerodynamic drag during movement of the trailer. Conventional ramps of the trailers are not useful in aiding in storage of large cargo items and individuals desire a device that can help in using ramps for storing large cargo items.

Therefore, there exists a long-felt need in the art for a trailer that can support cargo items having a size larger than a length of the trailer bed. There is also a long-felt need in the art for a trailer that improves transportation of larger and longer cargo items. Additionally, there is a long-felt need in the art for a method that expands the overall length of a trailer bed. Moreover, there is a long-felt need in the art for a device that expands the length of the trailer bed while enhancing aerodynamics of the trailer during motion. Further, there is a long-felt need in the art for a device that enables users to securely store large and bulky items in a trailer while preventing accidents occurring because of the cargo load extending over the length of the trailer. Furthermore, there is a long-felt need in the art for a device that can be removably attached to the trailer for expanding the length of the trailer bed. Finally, there is a long-felt need in the art for a device that reduces aerodynamic drag on the trailer and increases fuel efficiency.

The subject matter disclosed and claimed herein, in one embodiment thereof, comprises a ramp gate trailer bed extension device for extending a length of a trailer bed using the ramp gate for supporting cargo items. The device includes a pair of identical telescoping iron or telescoping rods, each iron bar is attached to the ramp of a trailer to provide an extended load bed. More specifically, each rod has two opposite ends, each end having a clip, a first clip is attached to a sidewall top corner of the trailer and a second clip is attached to a trailing edge of the ramp, the bars are configured to pivot and extend or retract enabling the ramp to go up or down, wherein the ramp is secured in a substantially horizontal position to become selectively coplanar with the trailer bed thereby expanding overall length of the trailer bed to support items that extend beyond the length of the trailer bed.

In this manner, the ramp gate trailer bed extension device of the present invention accomplishes all of the forgoing objectives and provides users with a drop-down trailer gate capable of expanding the overall length of a trailer bed for transporting larger cargo. The device is attached to the trailer and ramp via secure metal clips, maintaining optimal security when the extension is fully expanded. The device improves transportation of larger and longer cargo items like a kayak, ensuring the item is fully secured without compromising fuel efficiency and aerodynamic drag.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a mechanical device for extending length of a trailer bed for supporting cargo items. The mechanical device is used with a trailer gate for expanding the overall length of a trailer bed. The device includes a pair of identical iron or telescoping rods, each iron bar is attached to the ramp or gate of a trailer to provide an extended load bed. More specifically, each rod has two opposite ends, each end having a stainless-steel clip, a first clip is attached to a sidewall top corner of the trailer and a second clip is attached to a trailing edge of the ramp, the bars are configured to pivot and extend or retract enabling the ramp to go up or down wherein the ramp is secured in a substantially horizontal position to become selectively coplanar with the trailer bed thereby expanding overall length of the trailer bed to support items that extend out of the trailer bed. The bars are configured to pivot to secure the ramp in a substantially upright position when not used for supporting cargo items.

In yet another embodiment, a ramp gate trailer bed extension device is disclosed. The device is designed to be used with a ramp gate of a trailer for improving transportation of larger and longer cargo items that extend out of a conventional trailer bed. The device features two independent and identical telescoping iron or telescoping rods, each rod has a pair of stainless steel clips integrated at opposite ends; for each rod, a first clip of the pair of clips is attached to the corner of a sidewall of the trailer and a second clip of the pair of clips is attached to a corner of the trailing edge of the ramp gate, the bars are configured to pivot up upon movement of the ramp gate relative to the trailer bed, enabling the ramp gate to securely become selectively coplanar with the trailer bed to expand a length of the trailer bed for supporting longer cargo items that extend out of the trailer bed. The telescoping arms can telescope and extend a length from about 1 foot to about 5 feet.

In yet another embodiment, the ramp gate is aligned relative to the trailer at an angle from about 45-degrees to about 90-degrees when not used for supporting cargo items wherein the ramp gate is secured by extending the bars.

In yet another embodiment, a method of transporting a larger and longer cargo item, like a kayak, is disclosed. The method includes the steps of attaching a telescoping iron bar between a sidewall of a trailer and trailing edge of a ramp of the trailer; attaching another telescoping iron bar between an opposite sidewall of the trailer and the trailing edge of the ramp of the trailer; moving up the ramp to position the ramp substantially horizontal and coplanar with the trailer bed; securing the ramp in substantially horizontal and coplanar position by the bars; and placing a cargo item on the trailer bed such that a substantially portion of the item is placed on the substantially horizontal ramp.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a trailer that can support cargo items having a size larger than the length of the trailer bed. There is also a long-felt need in the art for a trailer that improves transportation of larger and/or longer cargo items. Additionally, there is a long-felt need in the art for a method that expands the overall length of a trailer bed. Moreover, there is a long-felt need in the art for a device that expands the length of the trailer bed while enhancing aerodynamics of the trailer during motion. Further, there is a long-felt need in the art for a device that enables users to securely store large and/or bulky items on a trailer while preventing accidents occurring because of the cargo load extending over the length of the trailer. Furthermore, there is a long-felt need in the art for a device that can be removably attached to the trailer for expanding the length of the trailer bed. Finally, there is a long-felt need in the art for a device that reduces aerodynamic drag on the trailer and increases fuel efficiency.

The present invention, in one exemplary embodiment, is a ramp gate trailer bed extension device. The device is a mechanical device and is designed to be used with a ramp gate of a trailer for improving transportation of larger and/or longer cargo items that extend out of, or beyond, the length of a conventional trailer bed. The device includes two separate and identical telescoping flat iron or telescoping rods, each rod has a pair of stainless steel clips integrated at opposite ends; for each rod, a first clip of the pair of clips is attached to the corner of a sidewall of trailer and a second clip of the pair of clips is attached to a corner of the trailing edge of the ramp gate, the bars are configured to pivot upon movement of the ramp gate relative to the trailer bed enabling the ramp gate to securely become coplanar with the trailer bed to expand a length of the trailer bed for supporting longer cargo items that extend out of the trailer bed.

Figure 1:
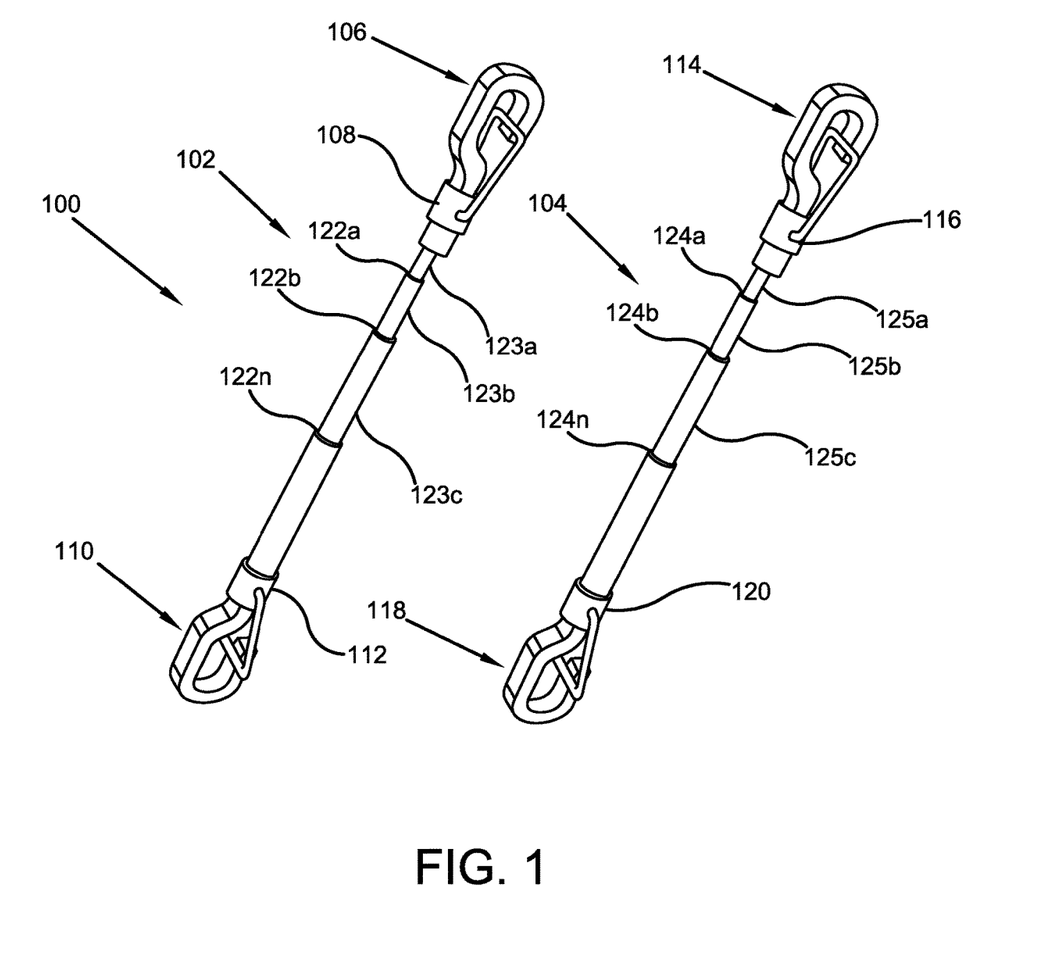
FIG. 1 illustrates a perspective view of one potential embodiment of a ramp gate trailer bed extension device of the present invention in accordance with the disclosed architecture.
Figure 2:
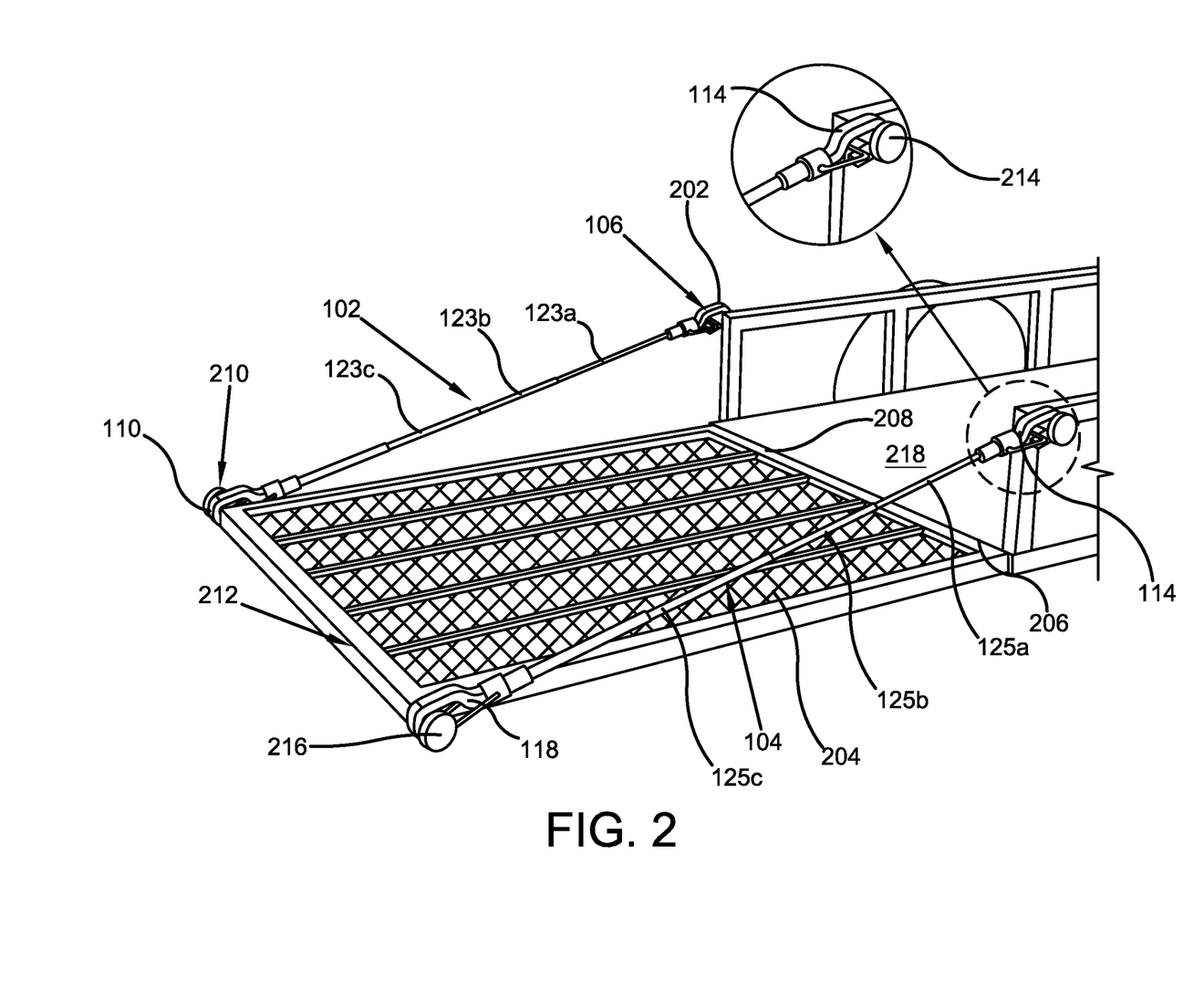
FIG. 2 illustrates a perspective view showing the iron or telescoping rods being fastened to the trailer and the ramp gate for extending length of the trailer bed in accordance with the disclosed architecture.
Figure 5:
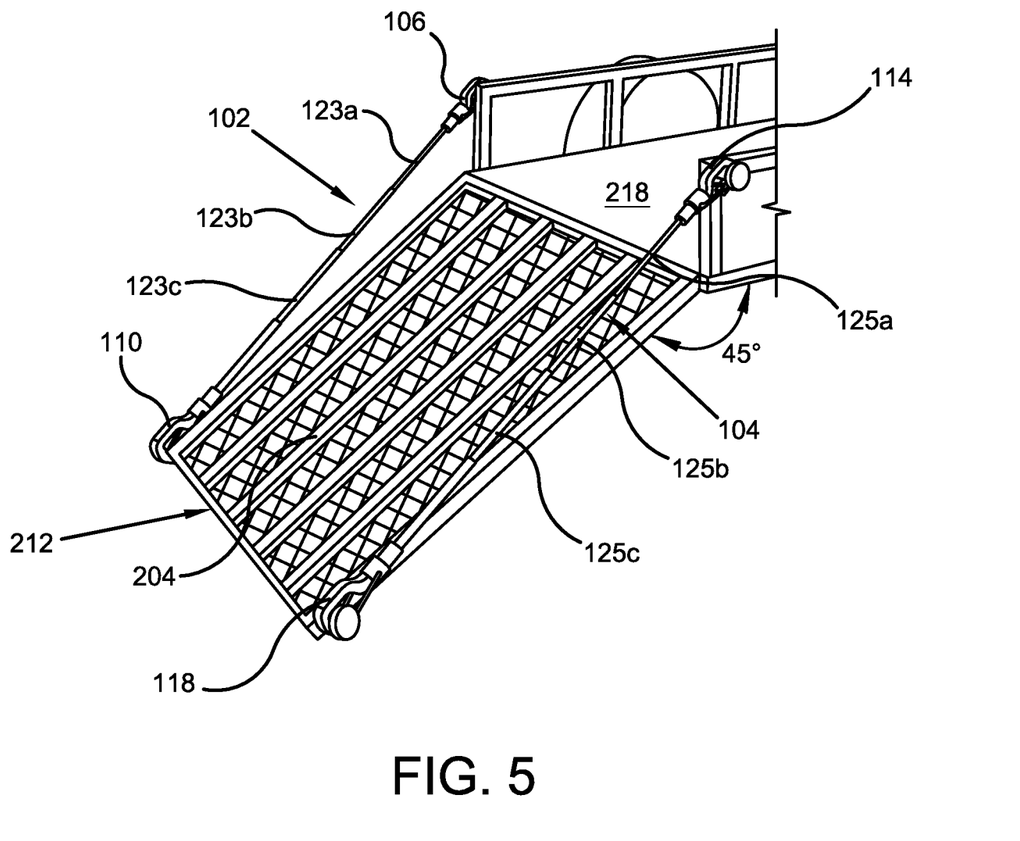
FIG. 5 illustrates a perspective view showing the ramp gate positioned at a 45-degree angle relative to the load/trailer bed for offering enhanced aerodynamics in accordance with the disclosed architecture.

Referring initially to the drawings, FIG. 1 illustrates a perspective view of one potential embodiment of a ramp gate trailer bed extension device of the present invention in accordance with the disclosed architecture. The ramp gate trailer bed extension device 100 of the present embodiment is designed to attach to the ramp or drop gate of a trailer such that the ramp gate becomes selectively coplanar with the trailer bed to expand the length of the trailer bed as illustrated in FIG. 2. The trailer bed extension device 100 is further configured to hold the ramp gate at a selectively 45-degree angle to the trailer bed for offering the enhanced aerodynamics as illustrated in FIG. 5. More specifically, the device 100 includes a pair of extendable flat iron or telescoping rods 102, 104. The iron or telescoping rods 102, 104 are identical and are durable and lightweight. The first iron bar or rod 102 has a first clip fastener 106 at first end 108 and a second clip fastener 110 at opposite end 112. The first clip fastener 106 is configured to attach to the trailer and the second clip 110 is attached to the trailing edge of the ramp gate.

The second iron bar or rod 104 has a first clip 114 at first end 116 and a second clip 118 at opposite end 120. The first clip 114 is attached to the trailer and the second clip 118 is attached to the trailing edge of the ramp gate. The attachment of the iron bars or rods 102, 104 to the trailer and the ramp gate is illustrated and described in FIG. 2 for expanding the length of the trailer bed. The rods 102, 104 can telescope an additional length from about 1 foot to about 5 feet.

Both the rods 102, 104 are telescoping and have respective telescoping points 122a-n, 124a-n. The telescoping rods 102, 104, in one exemplary embodiment, comprise at least three rod sections 123a, 123b, 123c, and, 125a, 125b, and 125c, respectively. The telescoping points enable the respective bars to automatically extend or retract enabling the smooth movement of the ramp gate. The clips 106, 110, 114, 118 are preferably made of stainless steel and provide secure attachment for the bars or rods. The length of the rods 102, 104 and design of the clips 106, 110, 114, 118 can vary depending on the user requirements and size of the trailer. In one exemplary embodiment the rods can extend or telescope an additional length from about 1 foot to about 5 feet.

FIG. 2 illustrates a perspective view showing the iron or telescoping rods being fastened to the trailer and the ramp gate for extending a length of the trailer bed in accordance with the disclosed architecture. The clip 106 is fastened to the trailer corner 202 such that the clip 106 securely engages with the trailer corner 202 without sliding and/or slipping. For enabling a controlled pivotal movement of the ramp gate 204 along the hinged edge 206 positioned on the trailer bed edge 208, the clip 110 is positioned on the first end 210 of the trailing edge 212 of the ramp gate 204.

Figure 4:
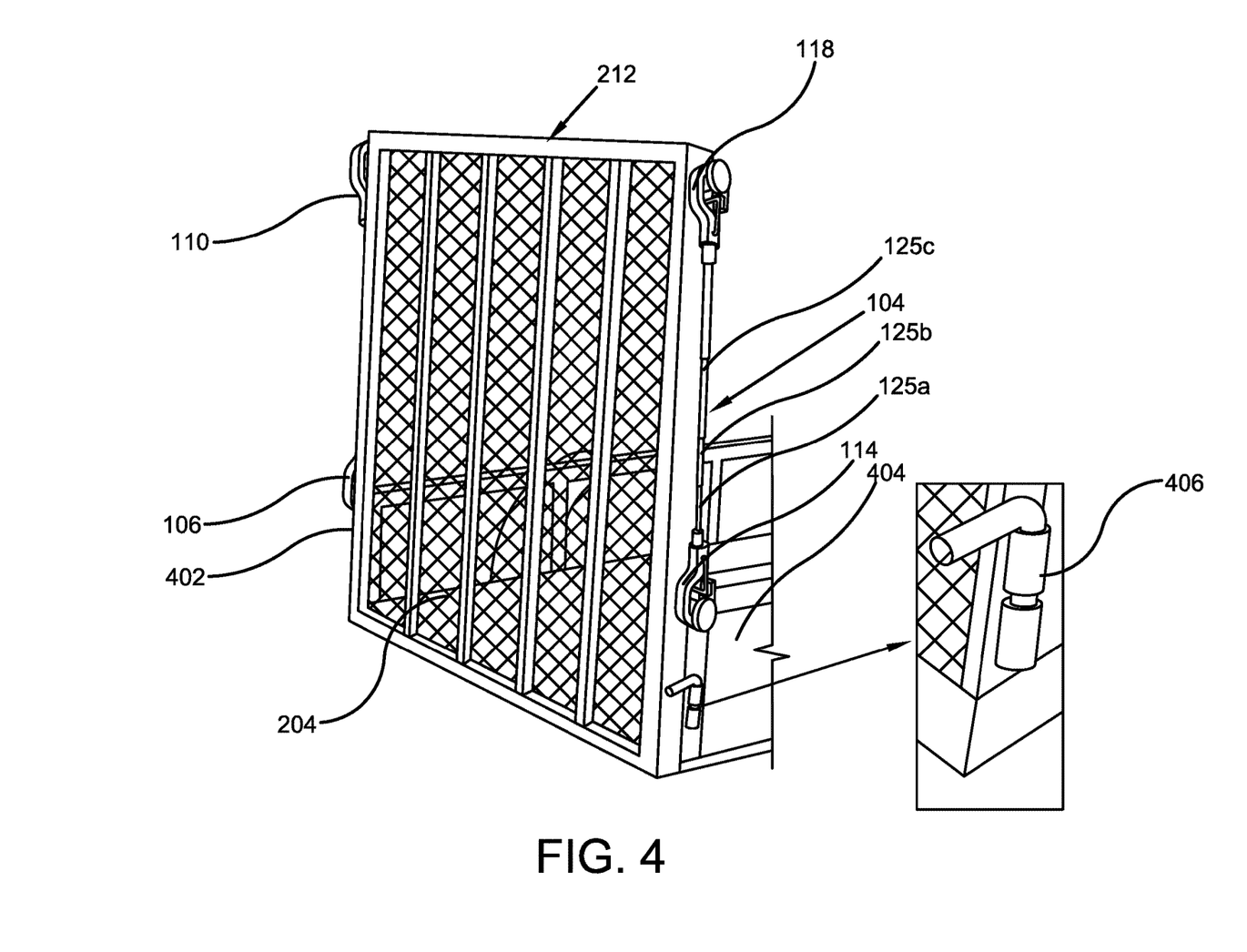
FIG. 4 illustrates a perspective view showing the ramp of the trailer in a substantially upright position when not in use for supporting a cargo item in accordance with the disclosed architecture.

The clip 114 is releasably fastened to the opposite trailer corner 214 and the opposite clip 118 of the bar 104 is releasably fastened to the second end 216 of the trailing edge 212 of the ramp gate 204. The clips 106, 114 enable the rods 102, 104 to securely attach to the trailer such that when the ramp 204 moves down from a substantially upright position (as shown in FIG. 4) the length of the rods 102, 104 extend using the telescoping points as illustrated in FIG. 1 enabling the ramp 204 to extend in a coplanar position to the trailer bed 218. The ramp 204 extends the length of the trailer bed 218 while the rods 102, 104 secures the ramp 204 in a substantially horizontal position. The rods 102, 104 are extended and prohibit the automatic downward movement of the ramp 204.

Figure 3:
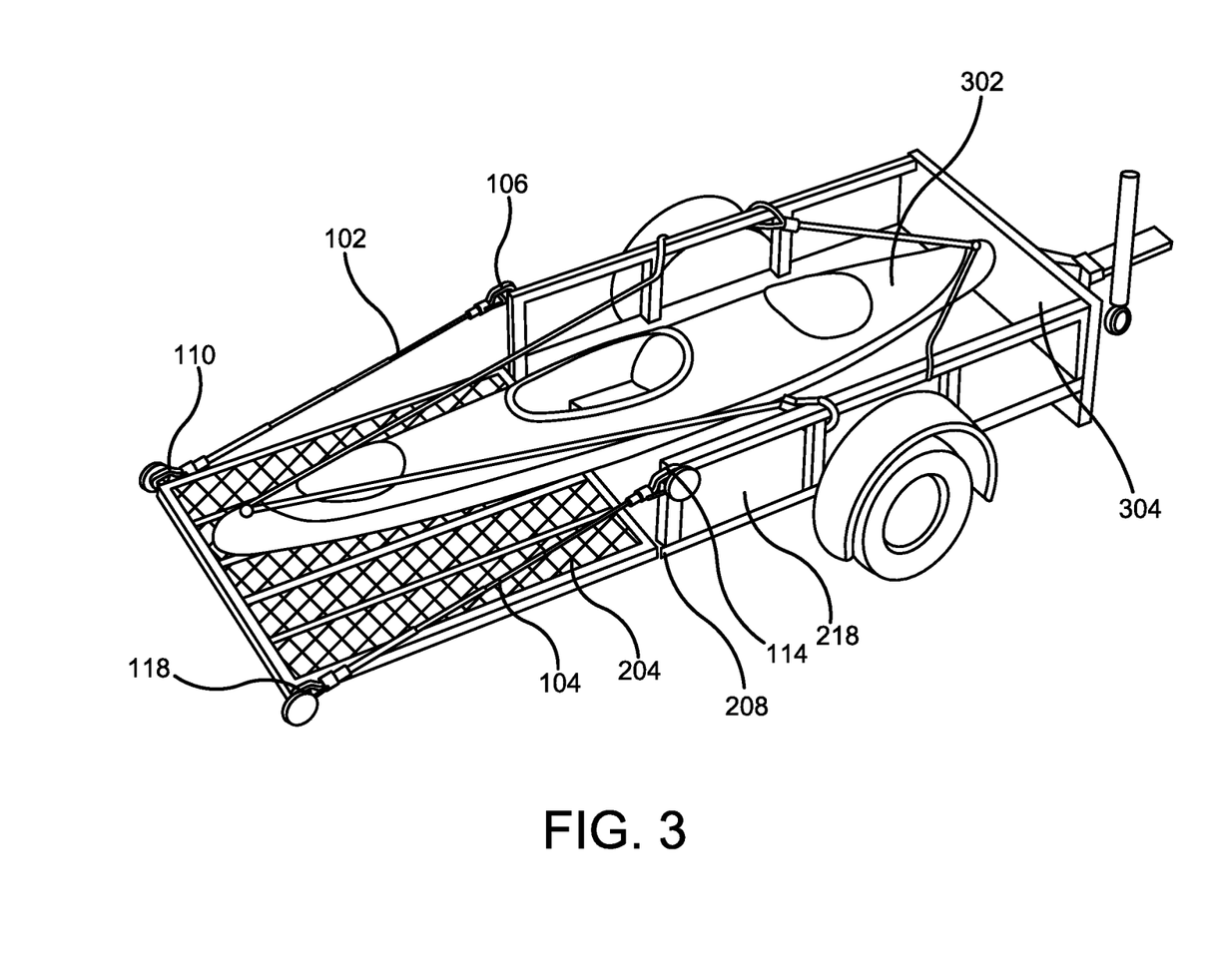
FIG. 3 illustrates a perspective view showing a kayak being supported by the extended trailer bed ramp device of the present invention in accordance with the disclosed architecture.

FIG. 3 illustrates a perspective view showing a kayak being supported by the extended trailer bed ramp device of the present invention in accordance with the disclosed architecture. The system 100 of the present invention is designed to support items that are longer than the length of the trailer bed. In the present embodiment, a kayak 302, having a length longer than the length of the trailer bed 218 is supported by the ramp 204 positioned coplanar with the trailer bed 218. The length of the bed 218 is measured from the front wall 304 of the bed 218 to the trailer bed edge 208.

As illustrated in FIGS. 2 and 3, the ramp 204 is positioned coplanar to the bed 218, therefore, a portion of the kayak 302 extending out of the trailer bed 218 is supported by the ramp 204. The rods 102, 104 securely maintains the substantially horizontal position of the ramp 204 even when the trailer is in motion. The rods 102, 104 are locked to support the ramp 204 in substantially horizontal position and as a result optimal security is provided to the item 302 and fellow drivers as well.

Conventional ropes and wires can be used for further securing the kayak 302 and preventing the kayak 302 from sliding laterally. The ropes and wires can be any conventional wires and are not a part of the inventive system/product of the present invention.

FIG. 4 illustrates a perspective view showing the ramp of the trailer in a substantially upright position when not in use for supporting a cargo item in accordance with the disclosed architecture. The ramp 204 can move from a substantially horizontal position shown in FIG. 3 to a substantially upright position as illustrated in the present embodiment. The ramp 204 when positioned substantially upright is supported by the sidewalls 402, 404 of the trailer and the iron or telescoping rods 102, 104 are retracted enabling the secure positioning of the ramp 204. It should be noted that when the ramp 204 moves up to the upright position, the rods 102, 104 are automatically pivoted and retracted to adjust to the relative space between the ramp 204 and the trailer bed 218.

For further securing the ramp 204 in the upright position, the system of the present invention provides additional latch pins 406 on both sidewalls 402, 404 that securely latch the ramp 204 in the upright position. In one embodiment, the rods 102, 104 can have a hydraulic mechanism for extending and retracting the length of the rods.

FIG. 5 illustrates a perspective view showing the ramp gate positioned at a 45-degree angle relative to the load/trailer bed for offering enhanced aerodynamics in accordance with the disclosed architecture. The ramp gate 204 is designed to move up and down relative to the trailer bed 218 such that the rods 102, 104 automatically pivot to assist in movement of the ramp gate 204. It should be appreciated that that the rods 102, 104 can be locked at the length when the ramp gate 204 becomes substantially parallel to the trailer bed 218 as illustrated in FIGS. 2 and 3. When the ramp gate 204 is not used for supporting a cargo item and also not positioned upright, then for reducing drag on the trailer during movement and for increasing fuel efficiency, the gate 204 can be moved downward to extend the rods 102, 104 such that the gate 204 can be automatically locked at a 45-degree angle relative to the trailer bed 218.

During pivotal movement of the rods 102, 104, the clips remain secure to maintain a secured attachment of the rods 102, 104. In some embodiments, the ramp gate 204 can form a 45-degree angle relative to the trailer bed 218 in a position between the substantially horizontal position as illustrated in FIG. 2, and the substantially upright position as illustrated in FIG. 4.

Figure 6:
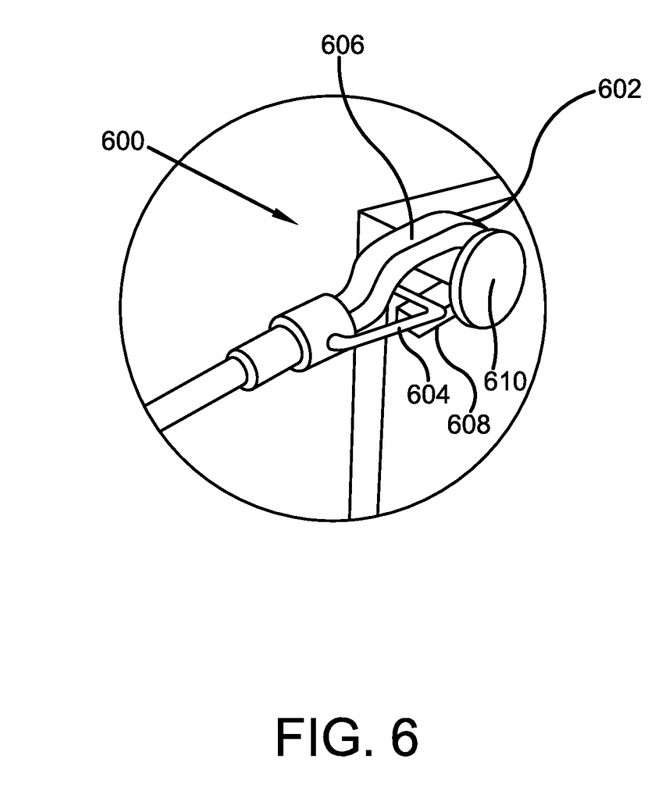
FIG. 6 illustrates an enlarged view showing exemplary clip used in the ramp gate trailer bed extension system of the present invention in accordance with the disclosed architecture.

FIG. 6 illustrates an enlarged view showing an exemplary clip used in the ramp gate trailer bed extension system of the present invention in accordance with the disclosed architecture. The exemplary clip 600 corresponds to any clip used in the other embodiments of the present invention for attaching the rods 102, 104 to the trailer and the ramp gate. The clip 600 is made of rustproof stainless steel and has a U-shape bar 602 that is hooked around a portion of the trailer or the ramp gate. A hinged clip arm 604 is configured to move towards the main portion 606 and the hooked portion 608 of the U-shape bar 602. For removing the clip 600, the hinged clip arm 604 is moved towards the main portion 606 so that the U-shape bar 602 can be easily pulled and released from the element 610 to which the clip 600 is fastened.

Once, the clip 600 is appropriately positioned in the element 610, the clip arm 604 can be released to move towards the hooked portion 608 to securely position the clip 600 and the attached corresponding rod.

Certain terms are used throughout the following description and claims to refer to particular features or components. As one skilled in the art will appreciate, different persons may refer to the same feature or component by different names. This document does not intend to distinguish between components or features that differ in name, but not structure or function. As used herein "ramp gate trailer bed extension device", "extension device", "trailer bed extension device", "system", and "device" are interchangeable and refer to the ramp gate trailer bed extension device 100 of the present invention.

Notwithstanding the forgoing, the ramp gate trailer bed extension device 100 of the present invention can be of any suitable size and configuration as is known in the art without affecting the overall concept of the invention, provided that it accomplishes the above-stated objectives. One of ordinary skill in the art will appreciate that the ramp gate trailer bed extension device 100 as shown in the FIGS. are for illustrative purposes only, and that many other sizes and shapes of the ramp gate trailer bed extension device 100 are well within the scope of the present disclosure. Although the dimensions of the ramp gate trailer bed extension device 100 are important design parameters for user convenience, the ramp gate trailer bed extension device 100 may be of any size that ensures optimal performance during use and/or that suits the user's needs and/or preferences.

Various modifications and/or additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A ramp gate trailer bed extension device comprising:
a trailer bed ramp extension device having a first telescoping rod and a second telescoping rod for selectively holding a ramp gate in a generally horizontal orientation;
wherein said first telescoping rod having a first clip fastener at a first end and a second clip fastener at an opposite end;
wherein said first clip fastener of said first telescoping rod attached to a trailer and said second clip fastener of said first telescoping rod attached to said ramp gate;
wherein said second telescoping rod having a first clip fastener at a first end and a second clip fastener at an opposite end;
wherein said first clip fastener of said second telescoping rod attached to a trailer and said second clip fastener of said second telescoping rod attached to said ramp gate;
wherein each said telescoping rod extending from a first length to a second length; and
further wherein said second length from about 1 foot to about 5 feet longer than said first length.

2. The ramp gate trailer bed extension device of claim 1, wherein said first telescoping rod having at least three telescoping rod sections, and further wherein said second telescoping rod having at least three telescoping rod sections.

3. The ramp gate trailer bed extension device of claim 2, wherein said clip fasteners having a material comprising stainless steel.

4. The ramp gate trailer bed extension device of claim 3, wherein said first clip fastener of said first telescoping rod fastened to a first trailer corner and said second clip fastener of said first telescoping rod fastened to a trailing end of said ramp gate.

5. The ramp gate trailer bed extension device of claim 4, wherein said first clip fastener of said second telescoping rod fastened to a first trailer corner and said second clip fastener of said second telescoping rod fastened to a trailing end of said ramp gate.

6. The ramp gate trailer bed extension device of claim 5, wherein said trailer bed having a hinged edge, and further wherein said ramp gate pivots along said hinged edge.

7. The ramp gate trailer bed extension device of claim 6, wherein said first clip fastener is releasably fastened.

8. The ramp gate trailer bed extension device of claim 1, wherein said first telescoping rod and said second telescoping rod move from a retracted orientation to an extended orientation when said ramp gate moves from a vertical orientation to a horizontal orientation.

9. The ramp gate trailer bed extension device of claim 8, wherein said ramp gate in the horizontal orientation is coplanar with the trailer bed.

10. A ramp gate trailer bed extension device comprising:
a trailer bed ramp extension device having a first telescoping rod and a second telescoping rod for selectively holding a ramp gate in a selectively vertical orientation or a horizontal orientation;
wherein said first telescoping rod having a first clip fastener at a first end and a second clip fastener at an opposite end;
wherein said first clip fastener of said first telescoping rod attached to the trailer and said second clip fastener of said first telescoping rod attached to said ramp gate;
wherein said second telescoping rod having a first clip fastener at a first end and a second clip fastener at an opposite end;
wherein said first clip fastener of said second telescoping rod attached to the trailer and said second clip fastener of said second telescoping rod attached to said ramp gate;
wherein each said telescoping rod extending from a first length to a second length;
wherein said second length from about 1 foot to about 5 feet longer than said first length;
wherein said first clip fastener of said first telescoping rod fastened to a first trailer corner and said second clip fastener of said first telescoping rod fastened to a trailing end of said ramp gate;
wherein said first clip fastener of said second telescoping rod fastened to a first trailer corner and said second clip fastener of said second telescoping rod fastened to a trailing end of said ramp gate; and
further wherein said first telescoping rod and said second telescoping rod move from a retracted orientation to an extended orientation when said ramp gate moves from a vertical orientation to a horizontal orientation.

11. The ramp gate trailer bed extension device of claim 10, wherein said first telescoping rod having at least three telescoping rod sections, and further wherein said second telescoping rod having at least three telescoping rod sections.

12. The ramp gate trailer bed extension device of claim 11, wherein said clip fasteners having a material comprising stainless steel.

13. The ramp gate trailer bed extension device of claim 12, wherein said trailer bed having a hinged edge, and further wherein said ramp gate pivots along said hinged edge.

14. The ramp gate trailer bed extension device of claim 13, wherein said first clip fastener is releasably fastened.

15. Then ramp gate trailer bed extension device of claim 14, wherein said ramp gate in the horizontal orientation is coplanar with the trailer bed.

16. A ramp gate trailer bed extension device comprising:
a trailer bed ramp extension device having a first telescoping rod and a second telescoping rod for selectively holding a ramp gate in a selectively vertical orientation or a horizontal orientation;
wherein said first telescoping rod having a first clip fastener at a first end and a second clip fastener at an opposite end;
wherein said first clip fastener of said first telescoping rod attached to the trailer and said second clip fastener of said first telescoping rod attached to said ramp gate;
wherein said second telescoping rod having a first clip fastener at a first end and a second clip fastener at an opposite end;
wherein said first clip fastener of said second telescoping rod attached to the trailer and said second clip fastener of said second telescoping rod attached to said ramp gate;
wherein each said telescoping rod extending from a first length to a second length;
wherein said second length from about 1 foot to about 5 feet longer than said first length;
wherein said first clip fastener of said first telescoping rod fastened to a first trailer corner and said second clip fastener of said first telescoping rod fastened to a trailing end of said ramp gate;
wherein said first clip fastener of said second telescoping rod fastened to a first trailer corner and said second clip fastener of said second telescoping rod fastened to a trailing end of said ramp gate;
wherein said first telescoping rod and said second telescoping rod move from a retracted orientation to an extended orientation when said ramp gate moves from a vertical orientation to a horizontal orientation; and
further wherein said ramp gate in the horizontal orientation is coplanar with the trailer bed.

17. The ramp gate trailer bed extension device of claim 16, wherein said first telescoping rod having at least three telescoping rod sections, and further wherein said second telescoping rod having at least three telescoping rod sections.

18. The ramp gate trailer bed extension device of claim 17, wherein said clip fasteners having a material comprising stainless steel.

19. The ramp gate trailer bed extension device of claim 18, wherein said trailer bed having a hinged edge, and further wherein said ramp gate pivots along said hinged edge.

20. The ramp gate trailer bed extension device of claim 19, wherein said first clip fastener is releasably fastened.

* * * * *